United States Patent Office 2,898,778
Patented Aug. 11, 1959

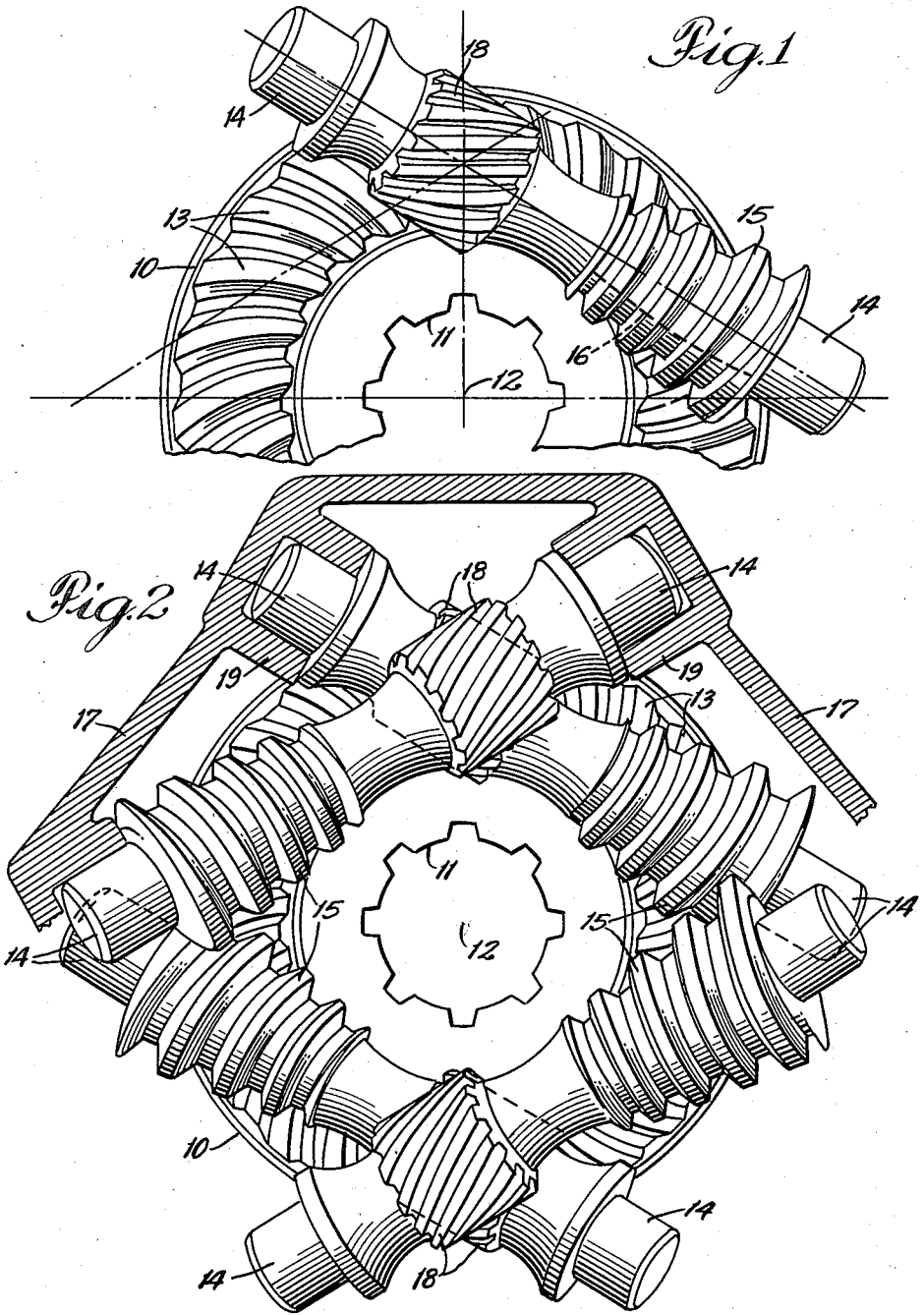

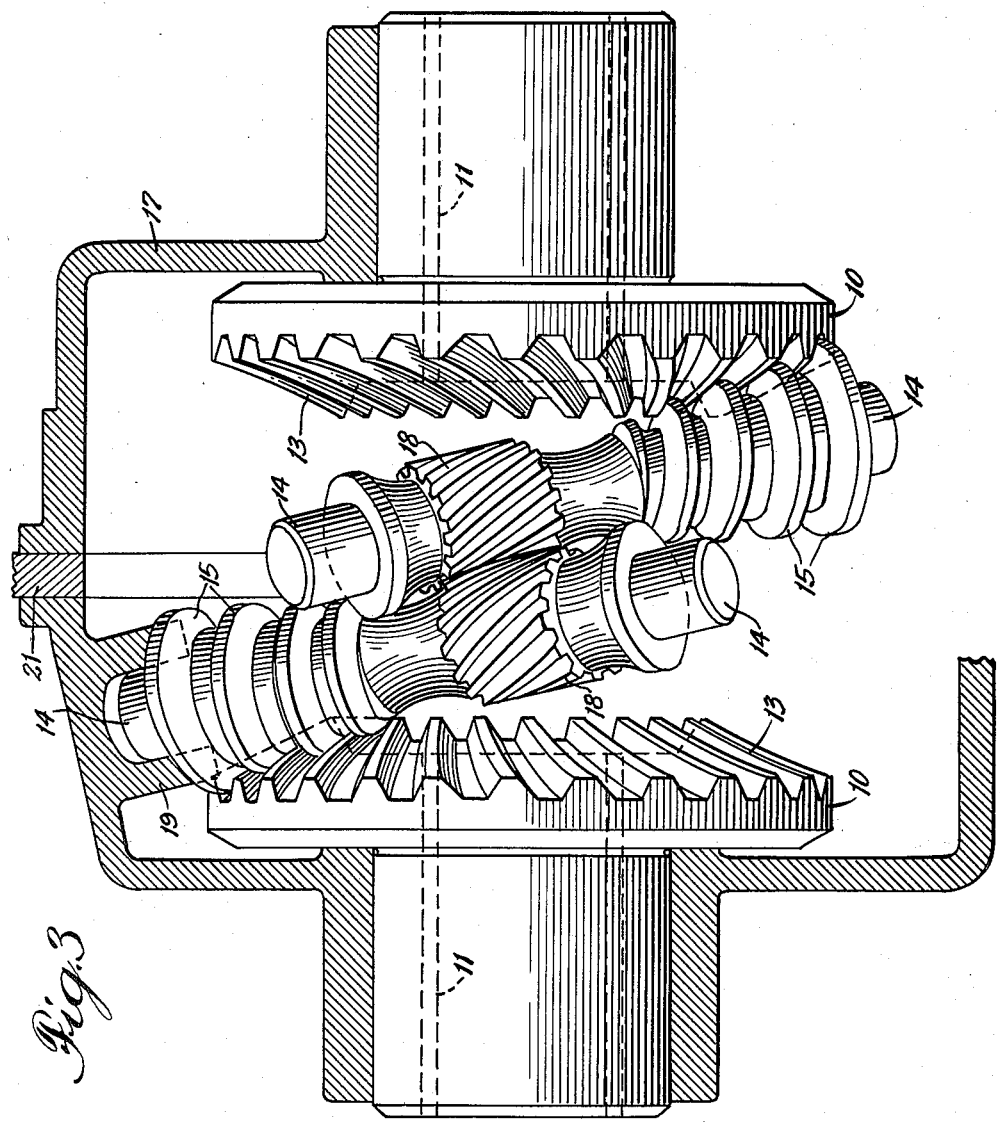

2,898,778

DIFFERENTIAL GEAR SET

Richard B. Ransom, South Bend, Ind.

Application July 2, 1957, Serial No. 669,527

4 Claims. (Cl. 74—711)

This invention relates to a differential gear set which is wholly or partially self-locking.

Various types of differential gear sets have been proposed which are wholly or partially self-locking so that each output shaft will be driven regardless of the relative loads on the shafts. The present invention relates to differential gearing of this general type.

It is an object of the invention to provide a differential gear set in which separate pinions mesh respectively with side gears and are drivably connected to each other through gear elements.

According to a feature of this construction, the side gears and pinions may be identical thereby minimizing the number of different parts required and accordingly facilitating assembly.

Another object is to provide a differential gear set in which the side gears and pinions are of the skew type with the pinions rectilinearly tapered.

The above and other objects and features of the invention will be more readily apparent from the following description when read in connection with the accompanying drawings, in which:

Figure 1 is an elevation of a side gear and pinion of a differential gear set embodying the invention;

Figure 2 is a view partially in section showing a differential gear assembly embodying the invention; and Figure 3 is a partial sectional view with the gear elements in elevation.

The gearing, as shown, comprises a gear 10 formed with a hub portion 11 for rotation about an axis indicated at 12 and having an annular toothed surface thereon. The gearing is preferably formed, as more particularly described and claimed in my co-pending application, Serial No. 669,528, filed July 2, 1957. As shown, the toothed surface is provided with a series of teeth 13 and as seen in Figure 3 is generally paraboloidal. Preferably for meshing with a rectilinearly tapered pinion, as described more fully hereinafter, the toothed surface and the surfaces of the teeth thereon, as viewed in a radial plane, are in the form of an annular paraboloid. As seen in Figure 1, the teeth 13 are wider and deeper at the outer radius of the tooth surface than at the inner surface and vary in pitch and depth uniformly from the outer to the inner surface.

The gear is adapted to mesh with a pinion or worm which is mounted on a shaft 14 lying in one plane parallel to and spaced from the axis 12 and at an acute angle to a plane perpendicular to the axis 12, as seen in Figure 3. The pinion is formed with one or more threads 15 meshing with the gear teeth 13 and is rectilinearly tapered throughout the effective pinion length. The thread, or threads, 15 are of maximum pitch and maximum depth at the outer larger diameter end of the pinion to mesh with the outer portions of the teeth 13 and vary uniformly in both pitch and depth to the smaller diameter end of the pinion at which they mesh with the inner shallower ends of the teeth 13.

The length of the pinion is determined by its angle relative to the gear and by the radial width of the toothed surface on the gear so that when the pinion and gear are assembled, the pinion threads at the larger diameter end of the pinion will engage the outer tip portion of the gear teeth 13 and the portions of the thread at the small diameter end of the pinion will mesh with the radially inner tip portions of the gear teeth 13. With this design, it has been found that the pinion threads will mesh with the gear teeth throughout the full length of the pinion, thereby providing maximum tooth contact and maximum strength of a gear set of a given size with minimum wear. The center line of the area of contact will follow approximately the dotted line 16, shown in Figure 1, and as seen in that figure is a smoothly curved concave line.

In a complete differential, two gears 10 are provided as shown in Figure 3 mounted co-axially in a housing 17 with their toothed surfaces in facing relationship. Pinions are utilized in pairs and there can be one pair, two pairs, or more pairs, as desired although in a practical installation two pairs of pinions, as shown in Figure 2, are preferable because of space limitations and because an assembly of this type produces a balanced system.

As shown in Figures 2 and 3, the axis of the two pinion shafts 14 lie in planes parallel to the gear axis and which cross each other at an acute angle. Viewed from the top, as in Figure 3, the pinion axes lie in planes parallel to each other and which are at an acute angle to a plane perpendicular to the gear axis.

The pinion shafts are connected to turn simultaneously and for this purpose each pinion shaft is formed with a toothed portion 18 having helical teeth whose angle to the shaft axis is equal to half of the angle between the planes parallel to the gear axis in which the pinion shafts lie. Thus, as seen in Figure 1, the teeth on the toothed portion 18 which face the adjacent pinion shaft bisect the angle between the shafts so that the facing teeth on the two pinion shafts will lie at the same angle and co-mesh. The pinion shafts may be supported in suitable bearings, indicated generally at 19 in the housing 17, and the housing may be split and assembled with a ring gear 21 secured thereto, as in a conventional differential construction.

With this construction, the gears and pinions are all of the same hand so that the number of different parts required is minimized and so that no errors in assembly are possible. Thus, because of the reversal in direction between the pinion shafts, due to the toothed portions 18, in assembling a differential according to the present invention, any two side gears and any number of pairs of pinions may be selected and assembled in the casing to complete the differential.

In use the differential housing 17 will be driven through its ring gear in the usual manner and will tend to carry the pinion assembly around with it. Through the teeth 15, the pinions will turn the side gears which may be connected to axle shafts in the usual manner to drive the wheels. In the event one axle tends to turn faster than the other, the pinion shafts may rotate relative to each other through their intermeshing toothed portions 18 to permit the side gears to turn relative to each other. Since the side gears mesh with the opposite sides of the pinions and since there is reversal in the toothed portions 18, relative rotation between the side gears can occur. The pitch of the teeth is preferably so selected that only a portion of the reaction on one side gear will be transmitted through the pinions to the opposite side gear. By selecting the correct pitch the pinions may be made more or less self-locking so that, in the event there is no load on one side gear, the other side gear will still be driven with a desired proportion of the torque imparted through the ring gear. For normal automotive design, this might be on the order of 85% to 95% of the input torque which can easily be accomplished according to the present invention.

Although gearing of the type specifically described above is highly advantageous, it will be recognized that many of the features of the invention can be realized by using specifically different gear units such as hypoid gears in the differential. Therefore, while one embodiment of the invention has been shown and described, it will be understood that this is to be taken as illustrative only and not as a definition of the invention, reference being had for this purpose to the appended claims.

What is claimed is:

1. A differential gear set comprising a pair of side gears mounted in spaced parallel coaxial relation and having facing toothed surfaces, a pair of pinions lying between the side gears on spaced axes which lie in planes parallel to the gear axis, said planes crossing at an obtuse angle facing inwardly toward the gear axis, each of the pinions meshing with the toothed surfaces of one of the side gears only, and intermeshing gear elements carried by the pinions and drivably connecting them.

2. The differential gear set of claim 1 in which the axes of the pinions lie at acute angles to a plane perpendicular to the gear axis.

3. A differential gear set comprising a pair of side gears mounted in spaced parallel coaxial relation and having facing annular paraboloidal toothed surfaces, a pair of rectilinearly tapered pinions each formed with at least one thread convolution of uniformly decreasing pitch and tooth depth from its large to its small end, said pinions lying between the side gears on spaced axes which lie in planes parallel to the gear axis, said planes crossing at an obtuse angle facing inwardly toward the gear axis, the pinions meshing with the side gears respectively, and means drivably connecting the pinions for simultaneous rotation.

4. The differential gear set of claim 3 in which the axes of the pinions lie at an acute angle to a plane perpendicular to the gear axis.

References Cited in the file of this patent

UNITED STATES PATENTS

| | | |
|---|---|---|
| 1,268,429 | Brown | June 4, 1918 |
| 2,628,508 | Gleasman | Feb. 17, 1953 |